United States Patent
Cox et al.

(10) Patent No.: US 7,285,519 B2
(45) Date of Patent: Oct. 23, 2007

(54) OIL PRODUCTION ADDITIVE FORMULATIONS

(75) Inventors: Terence Cox, Cleveland (GB); Neil Grainger, Cleveland (GB); Edward George Scovell, Middlesbrough (GB)

(73) Assignee: Croda International Plc, Goole, East Yorkshire (GB)

( * ) Notice: Subject to any disclaimer, the term of this patent is extended or adjusted under 35 U.S.C. 154(b) by 598 days.

(21) Appl. No.: 10/153,702

(22) Filed: May 24, 2002

(65) Prior Publication Data

US 2003/0051395 A1   Mar. 20, 2003

Related U.S. Application Data

(63) Continuation of application No. PCT/GB00/04509, filed on Nov. 27, 2000.

(60) Provisional application No. 60/169,630, filed on Dec. 8, 1999, provisional application No. 60/205,033, filed on May 18, 2000.

(30) Foreign Application Priority Data

Nov. 30, 1999 (GB) .................................. 9928127.1
Mar. 31, 2000 (GB) .................................. 0007831.1

(51) Int. Cl.
*C10L 1/18* (2006.01)
*C10M 129/70* (2006.01)

(52) U.S. Cl. .................... 508/463; 508/501; 44/388; 44/400

(58) Field of Classification Search .................. 44/388, 44/400; 508/463, 501
See application file for complete search history.

(56) References Cited

U.S. PATENT DOCUMENTS

| | | | |
|---|---|---|---|
| 2,284,080 A | 5/1942 | Backoff et al. | |
| 3,009,793 A | 11/1961 | Eckert et al. | |
| 3,054,666 A | 9/1962 | Neblett et al. | |
| 3,879,176 A | 4/1975 | Tsunemi | |
| 4,444,576 A | 4/1984 | Ryan et al. | |
| 5,087,268 A | 2/1992 | Parish | |
| 5,089,028 A | 2/1992 | Abramo et al. | |
| 5,417,725 A * | 5/1995 | Graves | 44/388 |
| 5,569,310 A * | 10/1996 | Cherpeck | 44/442 |
| 5,713,966 A * | 2/1998 | Cherpeck | 44/400 |
| 6,071,319 A * | 6/2000 | Morris et al. | 44/399 |
| 6,258,135 B1 * | 7/2001 | Caprotti et al. | 44/389 |
| 6,475,250 B2 * | 11/2002 | Krull et al. | 44/383 |
| 6,554,876 B1 * | 4/2003 | Tack et al. | 44/387 |
| 6,652,610 B2 * | 11/2003 | Krull et al. | 44/383 |
| 7,122,507 B2 * | 10/2006 | Grainger et al. | 507/137 |

FOREIGN PATENT DOCUMENTS

| | | |
|---|---|---|
| DE | 1236854 | 3/1967 |
| EP | 0664331 A1 | 7/1995 |
| EP | 0899318 A2 | 3/1999 |
| FR | 1321030 | 3/1962 |
| GB | 857142 | 12/1960 |
| GB | 932773 | 7/1963 |
| JP | 06001985 | 1/1994 |
| RO | 78329 | 2/1982 |
| WO | WO95/02654 | 1/1995 |
| WO | WO95/33022 | 12/1995 |

OTHER PUBLICATIONS

Smalheer et al, "Lubricant Additives", Section I—Chemistry of Additives, pp. 1-11, 1967.*
Chem Abs 99:178842 (Accession No 1983:578842) to RO (Romanian Patent) 78329 B publ (Oct. 1979) (Abstract only).

* cited by examiner

*Primary Examiner*—Ellen M. McAvoy
(74) *Attorney, Agent, or Firm*—Jones Day

(57) ABSTRACT

Petroleum additive formulations include a petroleum additive dissolved in a carrier fluid including at least one compound of the formula (I): $(R^2)_p$-Ph-$(CH_2)_m$—COO—$(AO)_n$—$R^1$ where; $R^1$ is $C_1$ to $C_{10}$ alkyl; AO is alkyleneoxy; n is 0 or from 1 to 100; m is 0, 1 or 2; and Ph is a phenyl group, which may be substituted with groups $(R^2)_p$; where each $R^2$ is independently $C_1$ to $C_{4\,alkyl}$ or alkoxy; and p is 0, 1 or 2. Further, crude petroleum or petroleum refinery streams can be treated by adding a petroleum additive dissolved in a carrier fluid of the formula (I) to the product stream. Desirably the carrier fluid is or includes iso-propyl benzoate and/or 2-ethyl hexyl benzoate.

50 Claims, No Drawings

OIL PRODUCTION ADDITIVE FORMULATIONS

CROSS REFERENCE TO RELATED APPLICATIONS

This application is a continuation of PCT/GB00/04509, filed Nov. 27, 2000, and further claims priority from British Application No. 9928127.1, filed Nov. 30, 1999, and British Application No. 0007831.1, filed Mar. 31, 2000. The International application also claims priority from two U.S. provisional applications, Ser. No. 60/169,630, filed Dec. 8, 1999, and Ser. No. 60/205,033, filed May 18, 2000. These applications in their entirety are incorporated herein by reference.

This invention relates to petroleum, oil production, additive formulations and particularly to such formulations in which an active component is dissolved in a carrier fluid and specifically when the carrier fluid is an aromatic acid ester, and to the use of such formulations in the production and processing, including refining of petroleum.

Additives are often used in petroleum to provide specific effects during processing or to provide particular properties in the petroleum. Commonly additives are formulated as solutions in a suitable carrier fluid, which is commonly heavy aromatic naphtha (HAN—a mixture of mainly $C_9$ and $C_{10}$ aromatic hydrocarbons—predominantly trimethyl benzenes, diethyl benzenes and dimethyl ethyl benzenes). HAN is a very effective solvent and is readily and widely available. Environmental considerations are leading to pressure to reduce the proportion of volatile aromatic compounds used in industrial applications, but to date no satisfactory substitute for HAN has been found.

The present invention is based on the discovery that certain esters of aromatic carboxylic acids, particularly benzoic acid, are very effective solvents and are environmentally much less objectionable than HAN and find application as solvents for petroleum additives, specifically additives to crude oil and in refinery processing. Accordingly, in refering to "petroleum" herein we mean crude oil and oil in refinery and similar processing that is subject to subsequent refinery operations and the phrases "petroleum additive" and "petroleum additive formulation" and related similar phrases have corresponding meanings.

The present invention accordingly provides a petroleum additive formulation which includes at least one petroleum additive dissolved in a carrier fluid including at least one compound of the formula (I):

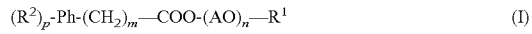

$$(R^2)_p\text{-Ph-}(CH_2)_m\text{—COO-}(AO)_n\text{—}R^1 \qquad (I)$$

where
$R^1$ is a $C_1$ to $C_{10}$ alkyl group, particularly a branched alkyl group, more usually a $C_1$ to $C_6$ alkyl group, more particularly a $C_3$ to $C_5$ branched alkyl group;
AO is an alkyleneoxy group, particularly an ethyleneoxy or a propyleneoxy group, and may vary along the (poly) alkyleneoxy chain;
n 0 or from 1 to 100, desirably 0;
m is 0, 1 or 2, desirably 0; and
Ph is a phenyl group, which may be substituted with groups $(R^2)_p$; where each $R^2$ is independently a $C_1$ to $C_4$ alkyl or alkoxy group; and p is 0, 1 or 2, desirably 0.

The invention includes a method of treating a crude petroleum or petroleum refinery stream including petroleum or a petroleum derivative, in which at least one petroleum additive dissolved in a carrier fluid, including at least one compound of the formula (I), as defined above, is introduced into the product stream. The invention further includes the use of compounds of the formula (I) as defined above, as carrier fluids for petroleum additives. As is discussed below, desirably the carrier fluid is or includes iso-propyl benzoate.

In particular the petroleum additive is at least one demulsification agent and/or at least one desalting agent; and/or at least one corrosion inhibitor. Accordingly the invention includes a petroleum additive formulation including one or more of at least one demulsification agent and/or at least one desalting agent; and/or at least one corrosion inhibitor dissolved in a carrier fluid including at least one compound of the formula (I) as defined above, in particular where the carrier fluid is or includes propyl benzoate. Further, the invention includes a method of treating a product stream including petroleum or a petroleum derivative, in which one or more of at least one demulsification agent and/or at least one desalting agent; and/or at least one corrosion inhibitor dissolved in a carrier fluid including at least one compound of the formula (I) as defined above, in particular where the carrier fluid is or includes iso-propyl benzoate, is introduced into the product stream.

Many of the petroleum additives used in the formulations of this invention are non-ionic surfactants and the invention accordingly includes a (at least one) compound of the formula (I) having dissolved therein at least one non-ionic surfactant.

Desirably in the compound of the formula (I) used in the invention $R^1$ is a is a branched alkyl group, particularly a $C_3$ to $C_8$ branched, such as a $C_3$ to $C_5$ secondary, alkyl group, e.g. it is an iso-propyl (prop-2-yl), sec-butyl (but-2-yl), iso-butyl (2-methyl-prop1-yl) and/or tert-butyl group, or a 2-ethyl hexyl group, the branching reducing the ease with which the ester can be hydrolysed. Esters with secondary alcohols are particularly useful in this regard and $R^1$ is thus especially a $C_3$ to $C_5$ secondary alkyl group and very desirably an iso-propyl group. Although the carboxylic acid used in the ester can be a dihydrocinnamic acid or a phenylacetic acid, it is very desirably a benzoic acid i.e. desirably m is 0. Similarly, although the phenyl ring of the acid may be substituted, it is desirable that it is unsubstituted i.e. desirably p is 0.

The esters used in the invention may include a (poly) alkyleneoxy chain, $(AO)_n$ in formula (I), between the carboxyl group and the group $R^1$. When present the (poly) alkyleneoxy chain is desirably a (poly)ethyleneoxy, a (poly) propyleneoxy chain or a chain including both ethyleneoxy and propyleneoxy residues. Generally, it is desirably not to include such a chain in the ester i.e. desirably n is 0.

Esters of the formula (I) that can be used in the invention include ethyl benzoate, propyl benzoate, iso-propyl benzoate, sec-butyl benzoate, iso-butyl benzoate, tert-butyl benzoate, 2-ethyl hexyl benzoate and nonyl benzoate. Among these, a particularly useful ester is iso-propyl benzoate and the invention specifically includes a petroleum additive formulation, particularly a formulation of at least one of the additives set out above, in which at least one petroleum additive is dissolved in iso-propyl benzoate as a carrier fluid. Iso-propyl benzoate has a combination of properties that make it exceptionally useful in the carrier fluid role. As a pure material, it has a wide liquid range having a high boiling point (BP ca 219° C.) and remaining fluid at temperatures below normally expected environmental temperatures (pour point <−60° C.); it has a flash point (ca 99° C.) so that it is classified as non-flammable and under normal use conditions it has a low vapour pressure; it has a density similar to that of water (1.008 kg.l$^{-1}$ at 25° C.); and a low viscosity (2.32 cSt at 25° C.; measured by the U tube method, equivalent to 2.34 mPa·s).

Desirably, the carrier fluid used in formulations of the invention is wholly of one or more compounds of the formula (I). However, if desired other solvents or carrier fluids may be used in admixture. Examples of other such fluids include propylene tetramer and ethyl lactate. Although HAN can be included it is unlikely that HAN or other carrier fluid or solvent including a substantial proportion of aromatic hydrocarbons will be used as a major component of any such mixed carrier fluid, because of its adverse environmental impact. When mixtures are used, compounds of the formula (I) will usually be present in at least 40%, more usually at least 50%, desirably at least 60%, and particularly at least 75%, by weight of the total carrier fluid used. When present, other carrier fluid components or solvents will desirably be used at level of from 1 to 40%, more desirably 2 to 25, and particularly 5 to 15% by weight of the total carrier fluid used.

Petroleum additives are materials added to petroleum materials, specifically crude oil and refinery petroleum streams to provide particular effects such as demulsification, desalting and anti corrosivity. Broadly the amount of the petroleum additive included in the formulation is typically from 10 to 99, more usually from 15 to 90%, particularly from 25 to 85%, by weight of the formulation. Generally the amount of additive added to the petroleum is within the range 0.5 to 1000 ppm, more usually from 1 to 300 ppm, by weight of the treated petroleum. Accordingly the amount of additive formulation added to the petroleum is usually from 1 to 1000 ppm, more usually from 1 to 300 ppm by weight of the treated petroleum. Within these general ranges, the amounts for particular additives may vary as is described below.

As is briefly indicated above a range of crude oil or refinery additives may be included in the formulations of the invention. The prime function of the additive is to provide the particular activity desired in the formulation in practical use. Examples of additives that can be used in formulations of this invention are discussed in more detail below.

Emulsions are produced during petroleum production when mixtures of petroleum and aqueous phases are subjected to high shear. Generally, these emulsions are water in oil emulsions with the water droplets stabilised by naturally occurring interfacially active materials such as asphaltenes, naphthenic acids and porphyrins. The presence of these materials creates a resistance to coalescence, which makes separation of the petroleum and aqueous phases more difficult. It is, thus, desirable to break these emulsions and commonly chemicals called demulsifiers or emulsion breakers are added to promote emulsion breaking.

It is desirable and often necessary to demulsify (and desalt) crude oils at the production site for the following technical reasons:
  demulsification gives a product with a lower viscosity which is therefore easier to transport;
  water removal which is beneficial because of the resultant energy saving; and
  reduction in the amount of corrosive materials in contact with production equipment.
In addition demulsification has the economic benefits:
  purchase specification limit on basic sediment and water value of crude petroleum; and
  a high level of water in crude petroleum is penalised by lower price.
Demulsifiers are usually solutions of surfactant materials in a carrier fluid.

The invention accordingly includes a petroleum, particularly crude oil, demulsification additive formulation which includes at least one demulsifier additive dissolved in a carrier fluid including at least one compound of the formula (I) as defined above, in particular where the carrier fluid is or includes iso-propyl benzoate.

The invention further includes a method of demulsifying a product stream, particularly a crude oil stream, including petroleum or a petroleum derivative, particularly crude oil, in which at least one demulsifier additive dissolved in a carrier fluid, including at least one compound of the formula (I), as defined above, is introduced into the product stream, in particular where the carrier fluid is or includes iso-propyl benzoate.

The invention also includes the use of compounds of the formula (I), as defined above, as carrier fluids for petroleum demulsifier additives, particularly for crude oil demulsifiers, in particular where the carrier fluid is or includes iso-propyl benzoate.

Typical demulsifier materials have surfactant properties and examples include alkyl phenol formaldehyde resin alkoxylates and EO/PO, block or random, co-polymers, which usually have molecular weights of from 1000 to 5000; post reacted EO/PO block co-polymers, particularly post reacted with isocyanate materials such as MDI [4,4'-methylenebis(phenylisocyanate)] and polyamine, particularly alkylene, especially ethylene, diamine, alkoxylates, which usually have molecular weights of from 10000 to 100000; and polyol, particularly glycerol, alkoxylates, which can have a wide range of molecular weights from 1000 to 20000 or higher. Demulsifiers with molecular weights less than 5000, typically effect demulsification by enhancing the rate of coalescence of the water droplets and demulsifiers with molecular weights greater than 5000, typically effect demulsification by enhancing flocculation of water droplets, particularly fine water droplets. It is common to use combinations of two or more e.g. up to seven demulsifiers to suit particular conditions in an oil stream, e.g. combinations of coalescence and flocculation enhancing agents.

The concentration of demulsifier components in the carrier fluid, or solvent, is typically from 10 to 90%, more usually from 15 to 85%, particularly from 25 to 80% by weight of the total formulation. Correspondingly, demulsifier formulations of the invention will typically include from 90 to 10%, more usually from 85 to 15%, particularly from 75 to 20% of the carrier fluid by weight of the total formulation. In use the amount of demulsifier included in an oil stream is typically from 1 to 500 ppm, particularly from 5 to 150 ppm, by weight of the oil stream. Accordingly, the addition rate of the demulsifier formulation to the oil stream will typically be from 5 to 1000 ppm, particularly from 10 to 300 ppm, by weight of the total formulation.

In handling oil streams, it is well known that corrosion can be highly damaging, particularly in refinery operations, indeed corrosion is the largest single contributor to refinery maintenance cost. One source of corrosion problems is the water soluble inorganic salts naturally present in crude oils. These contaminants include chlorides of calcium, magnesium and sodium. At furnace temperatures calcium and magnesium chlorides can be hydrolysed to give hydrogen chloride gas, which, in the presence of residual water and stripping steam, can produce a highly corrosive medium. Desalters are used to remove most of such salts, usually along with surplus water and solids, usually before the crude oil is pre-heated prior to vaporisation in the furnace. Typically, crude petroleum is desalted by water washing followed by dehydration, commonly enhanced by thermal, electrical and/or chemical treatment.

Thus, the invention includes a petroleum additive formulation which includes at least one desalting additive dissolved in a carrier fluid including at least one compound of the formula (I) as defined above, in particular where the carrier fluid is or includes iso-propyl benzoate. The invention further includes a method of desalting a product stream including petroleum or a petroleum derivative, in which at least one desalting additive dissolved in a carrier fluid, including at least one compound of the formula (I), as defined above, is introduced into the product stream, in particular where the carrier fluid is or includes iso-propyl benzoate. The invention further includes the use of compounds of the formula (I), as defined above, as carrier fluids for desalting additives, in particular where the carrier fluid is or includes iso-propyl benzoate.

Desalting chemicals are used to improve and or speed up the separation of the oil and aqueous phases. Typically, desalting chemicals are the same as or similar to demulsifiers and the description of demulsifiers and demulsifier formulations, including the concentrations of the materials used in formulations above also applies to desalters. The amount of desalters added to petroleum streams is typically somewhat lower than is used for demulsification, because the addition of water to dissolve potentially corrosive salts gives rise to emulsions that are usually more easily broken. In use, the amount of desalting agents added to an oil stream is typically from 1 to 300 ppm, particularly from 2 to 100 ppm, by weight of the oil stream. Accordingly, the addition rate of the demulsifier formulation to the oil stream will typically be from 2 to 500 ppm, particularly from 2 to 200 ppm, by weight of the total formulation.

Another sources of corrosion, particularly in oilfield and refinery operations, is water and impurities in it, present in the oil. The concentration of such impurities varies widely e.g. from parts per billion or as high as 30 to 40% by weight of the water. The four main groups of materials that are major contributors to corrosion are: inorganic salts, acid gases, oxygen and bacteria. Corrosion inhibitors are added to the petroleum stream as solutions in a carrier fluid to reduce or eliminate corrosion.

Accordingly, the invention includes a petroleum additive formulation which includes at least one corrosion inhibitor dissolved in a carrier fluid including at least one compound of the formula (I) as defined above, in particular where the carrier fluid is or includes iso-propyl benzoate. The invention further includes a method of treating a product stream including petroleum or a petroleum derivative, in which at least one corrosion inhibitor dissolved in a carrier fluid, including at least one compound of the formula (I), as defined above, is introduced into the product stream, in particular where the carrier fluid is or includes iso-propyl benzoate. The invention also includes the use of compounds of the formula (I), as defined above, as carrier fluids for corrosion inhibitors, in particular where the carrier fluid is or includes iso-propyl benzoate.

Corrosion inhibitors used in petroleum processing are commonly either film forming additives or neutralising additives. Film forming corrosion inhibitors are generally organic materials, which absorb or adsorb onto metal surfaces to form a coating that insulates the metal from the corrosive fluids. Generally, the inhibitor film forms a hydrophobic layer on the metal surface that prevents water from contacting the metal sufficiently for corrosion reactions to proceed. Although the coatings generated are not usually coherent self supporting films, the term "film forming" for corrosion inhibitors is widely used in this art and is used herein to describe such corrosion inhibitors. Examples of film forming corrosion inhibitors that can be used in this invention include: dimer/trimer fatty acids, phosphate esters, complex fatty amides and, particularly used in refineries, imidazolines. Neutralising agents can act as corrosion inhibitors by neutralising acidic materials that would otherwise be corrosive. Examples include amines, particularly alkanolamines such as dimethylaminoethanol.

The concentration of corrosion inhibitor(s), film forming and/or neutralising, in the carrier fluid, or solvent, is typically from 60 to 99%, more usually from 70 to 90%, particularly from 75 to 85% by weight of the total formulation. Such corrosion inhibitor formulations will typically include from 40 to 1%, more usually from 30 to 10%, particularly from 25 to 15% of the carrier fluid by weight of the total formulation.

In use the amount of corrosion inhibitor included in an oil stream is typically from 0.5 to 50 ppm, more usually from 1 to 25 ppm, particularly from 1 to 15 ppm, by weight of the oil stream. Accordingly, the addition rate of the corrosion inhibitor formulation to the oil stream will typically be from 1 to 100 ppm, more usually from 1 to 50 ppm, particularly from 1 to 30 ppm by weight of the total formulation.

The following Examples illustrate the invention. All parts and percentages are by weight unless otherwise stated.

Materials

| | Solvents |
|---|---|
| Sol1 | iso-propyl benzoate |
| Sol2 | ethyl benzoate |
| Sol3 | nonyl benzoate |
| Sol4 | 2-ethyl hexyl benzoate |
| Sol5 | a mixture 3:1 (by volume) of Sol1 and Sol3 |
| CSol1 | commercial heavy aromatic naphtha (HAN) solvent |
| D1 | commercial demulsifier - $C_9$ phenol formaldehyde resin alkoxylate (MW ca. 5400) |
| D2 | commercial demulsifier - $C_5$ phenol formaldehyde resin ethoxylate (MW ca. 1800) |
| D3 | commercial demulsifier - EP-PO copolymer post reacted with MDI (MW ca. 18000) |
| AC1 | commercial anticorrosion agent - Pripol 1040 a mixed dimer/trimer acid anticorrosion agent ex Uniqema |

EXAMPLE 1

A demulsifier fluid was made up from 20 parts by weight Sol1 (iso-propyl benzoate) and 80 parts by weight of a mixture of alkyl (mainly $C_5$, $C_8$ and $C_9$ alkyl) phenol formaldehyde resin alkoxylates. The fluid was a clear, one phase, stable liquid and can be used for demulsification and/or desalting applications. This Example was repeated using Sol2, Sol3, Sol4 and Sol5 and in each case the demulsifier fluid obtained was a clear, one phase, stable liquid and can be used for demulsification and/or desalting applications.

EXAMPLE 2

A demulsifier fluid was made up from 60 parts by weight Sol1 (iso-propyl benzoate), 20 parts by weight nonyl phenol formaldehyde resin ethoxylate and 20 parts by weight ethylene diamine alkoxylate. The fluid was a clear, one phase, stable liquid and can be used for demulsification and/or desalting applications. This Example was repeated using Sol2, Sol3, Sol4 and Sol5 and in each case the demulsifier fluid obtained was a clear, one phase, stable liquid and can be used for demulsification and/or desalting applications.

EXAMPLE 3

A demulsifier fluid was made up from 29 parts by weight Sol1 (iso-propyl benzoate), 54 parts by weight nonyl phenol formaldehyde resin ethoxylate and 17 parts by weight ethylene diamine alkoxylate. The fluid was a clear, one phase, stable liquid and can be used for demulsification and/or desalting applications. This Example was repeated using Sol2, Sol3, Sol4 and Sol5 and in each case the demulsfiler fluid obtained was a clear, one phase, stable liquid and can be used for demulsification and/or desalting applications.

EXAMPLE 4

A fluid corrosion inhibitor formulation was made up from 70 parts by weight Sol1 (iso-propyl benzoate) and 30 parts by weight film forming phosphate ester corrosion inhibitor. The fluid was a clear, one phase, stable liquid. This Example was repeated using Sol2, Sol3, Sol4 and Sol5 and in each case the corrosion inhibitor formulation obtained was a clear, one phase, stable liquid and can be used for corrosion inhibition applications.

EXAMPLE 5

A fluid corrosion inhibitor formulation was made up from 70 parts by weight Sol1 (iso-propyl benzoate) and 30 parts by weight dimer acid film forming corrosion inhibitor. The fluid was a clear one phase stable liquid. This Example was repeated using Sol2, Sol3, Sol4 and Sol5 and in each case the corrosion inhibitor formulation obtained was a clear, one phase, stable liquid and can be used for corrosion inhibition applications.

EXAMPLE 6

A fluid corrosion inhibitor formulation was made up from 70 parts by weight Sol1 (iso-propyl benzoate) and 30 parts by weight complex amide film forming corrosion inhibitor. The fluid was a clear one phase stable liquid. This Example was repeated using Sol2, Sol3, Sol4 and Sol5 and in each case the corrosion inhibitor formulation obtained was a clear, one phase, stable liquid and can be used for corrosion inhibition applications.

EXAMPLE 7

A fluid refinery neutralising corrosion inhibitor formulation was made up from 60 parts by weight Sol1 (iso-propyl benzoate) and 40 parts by weight dimethylaminoethanol neutralising agent corrosion inhibitor. The fluid was a clear, one phase, stable liquid. This Example was repeated using Sol2, Sol3, Sol4 and Sol5 and in each case the corrosion inhibitor formulation obtained was a clear, one phase, stable liquid and can be used for refinery neutralising corrosion inhibition applications.

EXAMPLE 8

A fluid refinery corrosion inhibitor formulation was made up from 60 parts by weight Sol1 (iso-propyl benzoate) and 40 parts by weight of an imidazoline corrosion inhibitor. The fluid was a clear, one phase, stable liquid. This Example was repeated using Sol2, Sol3, Sol4 and Sol5 and in each case the corrosion inhibitor formulation obtained was a clear, one phase, stable liquid and can be used for refinery neutralising corrosion inhibition applications.

EXAMPLE 9

Demulsifier test formulations were made up by dissolving one of each of the demulsifiers agents: D1, D2 and D3 in a carrier fluid at a concentration of 50% by weight. Examples 9.1 to 9.3 of the invention were made up using Sol1 (iso-propyl benzoate) as the carrier fluid and comparative Examples 9.C.1 to 9.C.3 were made up using CSol1 (HAN) as the carrier fluid. The demulsifier formulations were tested for their effect on a water in oil emulsion crude petroleum stream. Samples were taken immediately at the production wellhead on three successive days. The water content of the stream varied from 40 to 60% w/w. The samples were tested by placing 100 ml emulsion in a graduated bottle, adding the test demulsifier formulation at a dose of 50 ppm of active demulsifier, shaking the bottles (50×) to ensure good mixing of the demulsifier and holding the samples in a thermostat bath at 26° C. (the temperature of the crude oil stream) for 60 minutes. At the end of this time the extent of breaking of the emulsion was measured by the amount of water separated as a distinct phase and the result expressed as the percentage water separation based on the water content of the emulsion. Results are given as the average and standard deviation of the samples taken over the three days. The formulations and testing results are set out in Table 1 below:

TABLE 1

| Ex | Demulsifier | | Water separation | |
| --- | --- | --- | --- | --- |
| No | type | concn (ppm) | Av (%) | SD |
| 9.C.1 | D1 | 50 | 57 | 12.4 |
| 9.C.2 | D2 | 50 | 46 | 9.0 |
| 9.C.3 | D3 | 50 | 62 | 7.1 |
| 9.1 | D1 | 50 | 57 | 11.7 |
| 9.2 | D2 | 50 | 52 | 9.4 |
| 9.3 | D3 | 50 | 58 | 7.5 |

EXAMPLE 10

Demulsifier formulations were made up and tested broadly as described in Example 9 using solvents Sol1, Sol2, Sol3, Sol4 and Sol5 and comparison runs 10.C.1 to 10.C.3 using CSol1. The active demulsifiers used were D1, D2 and D3 as used in Example 9; the amount of demulsifer used was 20 ppm on the oil stream; and the temperature of the testing was 29.5° C. (the temperature of the oil stream). The results are set out in Table 2 below (the data for demulsifier D1 are the average of two runs the other data are single runs).

TABLE 2

| Ex No | Solvent | Demulsifier type | amount (ppm) | Water separation (%) |
|---|---|---|---|---|
| 10.C.1 | CSol1 | D1 | 20 | 49 |
| 10.C.2 | CSol1 | D2 | 20 | 38 |
| 10.C.3 | CSol1 | D3 | 20 | 33 |
| 10.1 | Sol1 | D1 | 20 | 47.5 |
| 10.2 | Sol1 | D2 | 20 | 42 |
| 10.3 | Sol1 | D3 | 20 | 36 |
| 10.4 | Sol2 | D1 | 20 | 49 |
| 10.5 | Sol2 | D2 | 20 | 41 |
| 10.6 | Sol2 | D3 | 20 | 39 |
| 10.7 | Sol3 | D1 | 20 | 46.5 |
| 10.8 | Sol3 | D2 | 20 | 30 |
| 10.9 | Sol3 | D3 | 20 | 48 |
| 10.10 | Sol4 | D1 | 20 | 46.5 |
| 10.11 | Sol4 | D2 | 20 | 26 |
| 10.12 | Sol4 | D3 | 20 | 48 |
| 10.13 | Sol5 | D1 | 20 | 50.5 |
| 10.14 | Sol5 | D2 | 20 | 35 |
| 10.15 | Sol5 | D3 | 20 | 48 |

EXAMPLE 11

Corrosion inhibition tests were carried out using an EG&G model 273 potentiostat. In which a metal (mild steel) coupon is mounted on a rotating cylindrical electrode, immersed in a salt solution, contained in a glass flask, and held at a constant potential with respect to a reference electrode and the current generated by corrosion of the metal surface is measured and converted by the instrument to a standard measure of corrosion rate mm.year$^{-1}$.

Prior to testing, the test coupons (from storage in a dessicator) were carefully weighed. The cylindrical electrode was wrapped with aluminum foil to provide good electrical contact and the coupon carefully mounted on the electrode. The coupon was then washed with isopropanol, deionised water, immersed in 15% hydrochloric acid for 30 seconds and then thoroughly rinsed in deionised water.

In the tests, 800 ml of brine solution (1.65 M NaCl, 0.021 M $CaCl_2.2H_2O$ and 0.009 M $MgCl_2.6H_2O$ in deionised water) was put in the glass flask and the carbon electrodes fitted. Before the test runs, the salt solution was purged for 40 minutes with gaseous nitrogen to remove dissolved oxygen. The nitrogen flow was turned off while the test coupon, mounted on a rotatable cylindrical electrode, was lowered into the brine and all the connections made to the electronics of the Potentiostat. A calomel reference electrode was then fitted in the flask as close to the coupon as possible (to give more reliable measurements). The nitrogen flow was restarted and the cylindrical electrode carrying the test coupon was rotated at 6000 rpm (100 Hz) for 1 hour to obtain a baseline corrosion measurement (in the absence of anticorrosion agent), the test anticorrosion agent was added and testing continued with the electrode being rotated at 6000 rpm, 4000 rpm (67 Hz), 2000 rpm (33 Hz) for 1 hour followed by 2 hours at 4000 rpm and 2 hours at 6000 rpm, with measurements being made at the end of each time period (the gas flow being turned off for 10 minutes prior to and during actual measurements). The level of test agent used was 25 ppm (weight/volume) of the active anticorrosion agent. The test material of the Example (Ex No 11) was a solution of 75% by weight anticorrosion agent AC1 in 25% by weight solvent Sol1. For comparison (11C) the neat anticorrosion agent was used. To ease addition of the small amount of test material to the test system the material of Ex No 11 was further diluted (to 35% wt/vol active) with isopropanol.

The instrument gives a readout of corrosion rate (CR) in milli-inches per year (mpy) (1mpy=0.0254 mm.year$^{-1}$) and results in the table below are given in this form and as a percentage Protection Efficiency (PE) which is calculated as:

$$PE(\%) = 100 \times [CR_{uninhibited} - CR_{inhibited}]/CR_{uninhibited}$$

TABLE 3

| Ex No | Time (hours) Rotation Speed (rpm) | 1 6000 | 2 6000 | 3 4000 | 4 2000 | 5 4000 | 6 6000 |
|---|---|---|---|---|---|---|---|
| 11 | CR | 39 | 35 | 24 | 8 | 20 | 32 |
|  | PE (%) | 0 | 11 | 40 | 80 | 48 | 18 |
| 11C | CR | 48 | 30 | 36 | 30 | 30 | 26 |
|  | PE (%) | 0 | 37 | 26 | 37 | 38 | 46 |

These data show that the formulation including the iso-propyl benzoate solvent remained effective in providing anticorrosion effects under the test conditions.

The invention claimed is:

1. A method of treating a crude oil, comprising:
   introducing into the crude oil a composition comprising at least one additive dissolved in a carrier fluid including at least one compound of the formula (I)

$$(R^2)_p\text{-Ph-}(CH_2)_m\text{—COO-}(AO)_n\text{—}R^1 \qquad (I)$$

where
   $R^1$ is a $C_1$ to $C_{10}$ alkyl group
   AO is an alkyleneoxy group which may vary along the (poly)alkyleneoxy chain;
   n 0 or from 1 to 100;
   m is 0, 1 or 2; and
   Ph is a phenyl group, which may be substituted with groups $(R^2)_p$; where each $R^2$ is independently a $C_1$ to $C_4$ alkyl or alkoxy group; and p is 0, 1 or 2.

2. A method as claimed in claim 1 wherein $R^1$ is a $C_1$ to $C_6$ alkyl group.

3. A method as claimed in claim 2 wherein $R^1$ is a $C_3$ to $C_5$ branched alkyl group.

4. A method as claimed in claim 1 wherein n is 0.

5. A method as claimed in claim 1 wherein n is 0 and m is 0.

6. A method as claimed in claim 1 wherein p is 0.

7. A method as claimed in claim 1 wherein n is 0, m is 0 and p is 0.

8. A method as claimed in claim 1 wherein the carrier fluid is or includes iso-propyl benzoate or 2-ethyl hexyl benzoate.

9. A method as claimed in claim 1 wherein the carrier fluid includes at least 50% by weight of the total carrier fluid of a compound of the formula (I).

10. A method as claimed in claim 1 wherein the additive is at least one demulsification agent and/or at least one desalting agent; and/or at least one corrosion inhibitor.

11. A method as claimed in claim 1 wherein the concentration of the additive is from 15 to 90% by weight of the formulation.

12. A method as claimed in claim 1 wherein the additive includes at least one demulsification agent at a concentration of from 15 to 85% by weight of the formulation.

13. A method as claimed in claim 1 wherein the additive includes at least one desalting agent at a concentration of from 15 to 85% by weight of the formulation.

14. A method as claimed in claim 1 wherein the additive includes at least one corrosion inhibitor at a concentration of from 70 to 90% by weight of the formulation.

15. A method as claimed in claim 1 wherein the crude oil is a crude oil stream.

16. A method of treating a petroleum product stream, which is a crude oil stream or an oil stream in a refinery that is subject to subsequent refinery operations, comprising:
introducing into the petroleum product stream a composition comprising at least one additive dissolved in a carrier fluid including at least one compound of the formula (I)

$$(R^2)_p\text{-Ph-}(CH_2)_m\text{—COO—}R^1 \qquad (I)$$

where
$R^1$ is a $C_1$ to $C_{10}$ alkyl group
m is 0, 1 or 2; and
Ph is a phenyl group, which may be substituted with groups $(R^2)_p$; where each $R^2$ is independently a $C_1$ to $C_4$ alkyl or alkoxy group; and p is 0, 1 or 2.

17. A method as claimed in claim 16 wherein the carrier fluid includes at least 50% by weight of the total carrier fluid of a compound of the formula (I).

18. A method as claimed in claim 16 wherein the additive is a demulsifier, desalter or corrosion inhibitor.

19. A method as claimed in claim 16 wherein the concentration of the additive is from 15 to 90% by weight of the formulation.

20. A method as claimed in claim 19 wherein the additive includes at least one demulsification agent at a concentration of from 15 to 85% by weight of the formulation.

21. A method as claimed in claim 19 wherein the additive includes at least one desalting agent at a concentration of from 15 to 85% by weight of the formulation.

22. A method as claimed in claim 19 wherein the additive includes at least one corrosion inhibitor at a concentration of from 70 to 90% by weight of the formulation.

23. A method as claimed in claim 16 wherein the concentration of the additive in the petroleum is from 1 to 300 ppm by weight.

24. A method as claimed in claim 23 wherein the additive includes at least one demulsification agent and the concentration of the additive in the petroleum is from 5 to 150 ppm by weight.

25. A method as claimed in claim 23 wherein the additive includes at least one desalting agent and the concentration of the additive in the petroleum is from 2 to 100 ppm by weight.

26. A method as claimed in claim 23 wherein the additive includes at least one corrosion inhibitor and the concentration of the additive in the petroleum is from 1 to 25 ppm by weight.

27. A method as claimed in claim 16 in which the additive composition comprises a solution of a non-ionic surfactant petroleum additive in the carrier fluid.

28. A method as claimed in claim 16 wherein the carrier fluid includes at least 50% by weight of the total carrier fluid of a compound of iso-propyl benzoate and/or 2-ethyl hexyl benzoate.

29. A method as claimed in claim 16 wherein $R^1$ is a $C_3$ to $C_6$ alkyl group.

30. A method as claimed in claim 29 wherein $R^1$ is a $C_3$ to $C_5$ branched alkyl group.

31. A method as claimed in claim 16 wherein m is 0.

32. A method as claimed in claim 16 wherein p is 0.

33. A method as claimed in claim 16 wherein n is 0, m is 0 and p is 0.

34. A method as claimed in claim 16 wherein the carrier fluid is or includes iso-propyl benzoate or 2-ethyl hexyl benzoate.

35. A method as claimed in claim 16, wherein the petroleum product stream being treated is a crude oil stream.

36. A method as claimed in claim 34, wherein the petroleum product stream being treated is a crude oil stream.

37. A formulation which is a carrier fluid having dissolved therein a petroleum additive which is or comprises a non-ionic surfactant in an amount of at least 15% by weight of the total formulation, wherein the carrier fluid is or includes at least 40% by weight of the total carrier fluid of at least one compound of the formula (I)

$$(R^2)_p\text{-Ph-}(CH_2)_m\text{—COO—}R^1 \qquad (I)$$

where
$R^1$ is a $C_1$ to $C_{10}$ alkyl group
m is 0,1 or 2; and
Ph is a phenyl group, which may be substituted with groups $(R^2)_p$;
where each $R^2$ is independently a $C_1$ to $C_4$ alkyl or alkoxy group; and p is 0, 1 or 2.

38. A formulation as claimed in claim 37 wherein $R^1$ is a $C_1$ to $C_6$ alkyl group.

39. A formulation as claimed in claim 38 wherein $R^1$ is a $C_3$ to $C_5$ branched alkyl group.

40. A formulation as claimed in claim 37 wherein m is 0.

41. A formulation as claimed in claim 40 wherein m is 0 and p is 0.

42. A formulation as claimed in claim 37 wherein the carrier fluid is or includes iso-propyl benzoate or 2-ethyl hexyl benzoate.

43. A formulation as claimed in claim 37 wherein the petroleum additive includes at least one demulsification agent and/or at least one desalting agent and/or at least one corrosion inhibitor.

44. A formulation as claimed in claim 37 wherein the additive is at least one demulsification agent; and/or at least one desalting agent; and/or at least one corrosion inhibitor.

45. A formulation as claimed in claim 37 wherein the concentration of the additive is from 15 to 90% by weight of the formulation.

46. A formulation as claimed in claim 45 wherein the additive includes at least one demulsification agent at a concentration of from 15 to 85% by weight of the formulation.

47. A formulation as claimed in claim 45 wherein the additive includes at least one desalting agent at a concentration of from 15 to 85% by weight of the formulation.

48. A formulation as claimed in claim 45 wherein the additive includes at least one corrosion inhibitor at a concentration of from 70 to 90% by weight of the formulation.

49. A formulation as claimed in claim 37 wherein the solvent fluid includes at least 50% by weight of the total carrier fluid of a compound of the formula (I).

50. A formulation as claimed in claim 37 wherein p is 0.

* * * * *